Figures 1, 2:
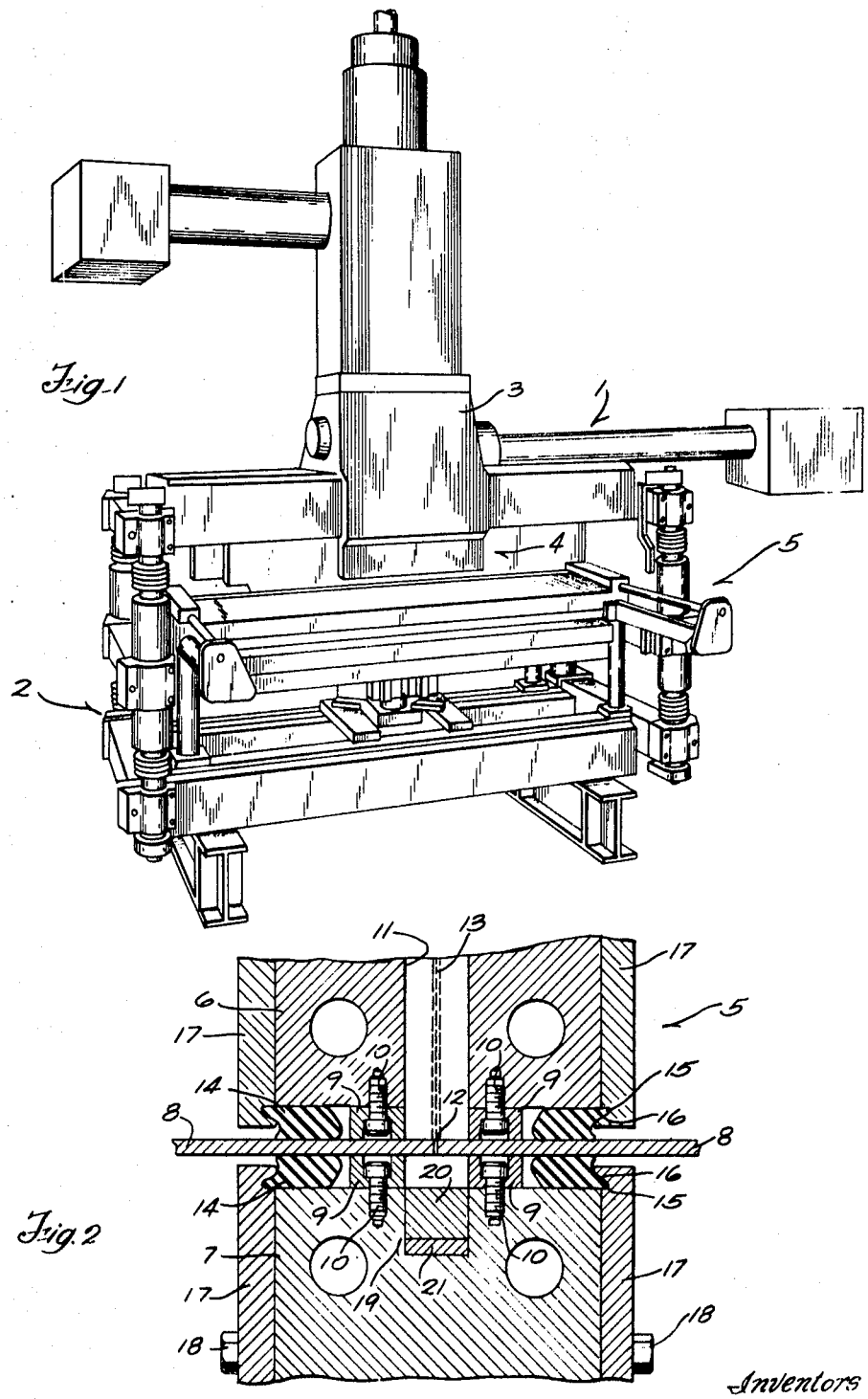

[11] 3,609,287

| [72] | Inventors | John F. Hinrichs<br>Menomonee Falls;<br>John J. Chyle, deceased, late of Milwaukee,<br>Wis. by Marion D. Chyle, executrix |
|---|---|---|
| [21] | Appl. No. | 4,859 |
| [22] | Filed | Jan. 22, 1970 |
| [45] | Patented | Sept. 28, 1971 |
| [73] | Assignee | A. O. Smith Corporation<br>Milwaukee, Wis.<br>Continuation-in-part of application Ser. No.<br>718,296, Mar. 4, 1968, now abandoned. |

[54] METHOD AND APPARATUS FOR ELECTRON BEAM WELDING
5 Claims, 2 Drawing Figs.

[52] U.S. Cl. .................................................. 219/121 EB, 219/137
[51] Int. Cl. ................................................... B23k 15/00
[50] Field of Search .......................................... 219/121, 121 EB, 50, 61, 62, 137, 160

[56] References Cited
UNITED STATES PATENTS

| 3,134,013 | 5/1964 | Opitz et al. ............... | 219/121 |
| 3,197,604 | 7/1965 | Turbyville et al. ........... | 219/73 |
| 3,227,350 | 1/1966 | Thielsch ................... | 228/56 |
| 3,339,058 | 8/1967 | Todd ...................... | 219/137 |
| 3,351,734 | 11/1967 | Arikawa et al. ............. | 219/137 |
| 3,426,173 | 2/1969 | Steigerwald ............... | 219/121 |
| 3,428,776 | 2/1969 | Stauffer .................. | 219/121 |
| 3,467,057 | 9/1969 | Tamura et al. ............. | 118/49.1 |

*Primary Examiner*—J. V. Truhe
*Assistant Examiner*—Robert E. O'Neil
*Attorney*—Andrus, Sceales, Starke & Sawall ABSTRACT: This invention relates to a method of welding low carbon steel using an electron beam. The portion of the workpiece being welded is located in an evacuated welding zone and a deoxidizing metal backup member is disposed in spaced relation to the joint to be welded. During welding, the electron beam vaporizes a portion of the deoxidizing metal and the release of the metal vapor aids in increasing the soundness of the weld.

PATENTED SEP 28 1971

3,609,287

Inventors
JOHN F. HINRICHS,
JOHN J. CHYLE, DECEASED,
BY MARION D. CHYLE, EXECUTRIX BY
Attorneys

METHOD AND APPARATUS FOR ELECTRON BEAM WELDING

This application is a continuation-in-part of application Ser. No. 718,296, filed Mar. 4, 1968 now abandoned and entitled Method and Apparatus for Electron Beam Welding.

The invention relates to a method of welding low carbon steel using an electron beam and particularly to a welding method in which a deoxidizing metal backup is vaporized during welding by the electron beam to increase the soundness of the weld.

The copending patent application of John F. Hinrichs entitled Electron Beam Welding of Rimmed Carbon Steel, Ser. No. 607,826 filed Jan. 6, 1967 now patent 3,529,122 describes a method of electron beam welding which is particularly adaptable for welding structural blanks in an assembly line operation. According to the method of that patent, the portions of the blanks to be welded are sealed in a sealed welding chamber. A vacuum is drawn in the welding chamber and the electron beam is focused at a point beyond the blanks so that the beam width at the intersection with the blanks is wider than the width of the beam at the point beyond the workpiece.

The present invention relates to a welding method of the type described in the above patent application of John F. Hinrichs. According to the present invention, a deoxidizing metal is employed as a backup and is spaced beneath the abutting edges of the rimmed steel to be welded. During the welding process the electron beam serves to vaporize a portion of the deoxidizing metal, and it is believed that the vaporized metal reacts with oxygen released from the interstices of the steel as well as oxygen resulting from the decomposition or reduction of oxides in the steel to provide stable compounds, thereby preventing oxidation of the molten weld metal and resulting in sound, uniform welds.

In some cases, a coating of the deoxidizing metal can be applied to the abutting edges of the blanks in conjunction with the backup member and during welding, the vaporized metal of the coating acts in conjunction with the vaporized metal of the backup member to further increase the wetability of the molten weld metal and provide more uniform penetration.

Other objects and advantages will appear in the course of the following description.

The drawings illustrate the best mode presently contemplated of carrying out the invention.

In the drawings:

FIG. 1 is a perspective view of the electron beam welding apparatus of the invention; and FIG. 2 is an enlarged fragmentary vertical section of the apparatus.

The drawings illustrate an electron beam welding apparatus 1 which can be similar to that described in the copending application of John F. Hinrichs, Ser. NO. 607,826 filed Jan. 6, 1967, now U.S. Pat. No. 3,529,122 and entitled Electron Beam Welding of Rimmed Carbon Steel.

As shown in the drawings, the apparatus 1 in general comprises a supporting frame 2, and a vacuum enclosure 3 is mounted on the frame. Located within the lower end of the vacuum enclosure 3 is a welding assembly 4, and a feeding mechanism 5 is adapted to feed the blanks to be welded to the welding assembly 4. As shown in FIG. 2, the welding assembly 4 includes a fixed upper platen 6 and a movable lower platen 7. The blanks 8 or workpieces to be welded are positioned on the lower platen 7 when the platen is in a lowered position, and the platen 7 is then raised to clamp the blanks 8 between the platens.

The blanks 8 are clamped between the platens by clamping blocks 9 which are located on either side of the joint between the blanks 8 and are secured to platens 6 and 7 by bolts 10.

Upper platen 6 is provided with a central opening 11 which defines a welding chamber and the joint 12 between the abutting ends of blanks 8 is located centrally of the welding chamber.

The blanks 8 to be welded are rimmed or semi-killed steel having a carbon content up to about 0.3 percent. A typical steel composition of the workpiece 8 is as follows:

| | |
|---|---|
| Carbon | 0.040–0.054% |
| Manganese | 0.32% |
| Silicon, sulfur, phosphorus, aluminum and titanium | trace |
| Iron | Balance |

A conventional electron beam gun assembly, such as that shown in U.S. Pat. No. 2,987,610, is mounted above the upper platen 6 and directs an electron beam 13 downwardly within the welding chamber 11 toward the joint 12 to be welded.

It is preferred to evacuate the welding chamber 11 during welding and this can be accomplished by sealing off the welding chamber by use of elongated, oval-shaped seals 14. Seals 14 are formed of of resilient deoxiding and are mounted in recesses in the respective platens. To retain the seals 14 in position, the outer periphery of each seal is provided with a lip or flange 15 which is received in a groove 16 in end plate 17. The end plates 17 are attached to the platens by bolts 18.

The sealed welding chamber 11 can be evacuated prior to welding by a conventional vacuum pump unit, as shown, which is connected to the welding chamber.

According to the invention, a backup assembly 19 is spaced beneath the joint 12 between the blanks 8, and is mounted in a recess in lower platen 7. The backup assembly includes a bar deoxidizing a deoxiding metal 20 which is mounted on a support bar 21 which can be formed of copper, steel or other metals.

The backup bar 20 is formed of a metal which will react with oxygen and other gases released from the blanks 8 during the welding operation. It has been found that aluminum is preferred because it is inexpensive, readily available and provides very satisfactory results. In addition, other deoxidizing metals such as titanium, silicon, zirconium, ferrotitanium, ferrisilicon, magnesium and the like can be substituted for the aluminum.

During the welding operation, the electron beam 13 is deflected so that it moves progressively along the joint between the edges 12 to progressively melt the edges. As the beam passes along the joint at a high rate of speed, generally above 25 inches per minute, the molten meal will rapidly solidify behind the beam to provide a welded joint. During the welding the beam 13 will also vaporize a portion of the metal of the backup bar 20. The metal vapor is believed to react with oxygen, as well as other gases which are released from the blanks 8 during the welding operation. By combining with the oxygen released from the steel, stable, high temperature oxides are produced, thereby minimizing oxidation of the molten weld metal and reducing porosity of the resulting weld. In addition, the vaporizing metal resulting from the vaporization of the bar 20 increases the wetability of the molten weld and provides a smoother weld surface eliminating undercutting at the longitudinal edges of the weld.

While the welding chamber itself is evacuated so that substantially no oxygen is present in the atmosphere of the chamber, oxygen is released during welding from the interstices of the steel, and oxygen can also be produced by the reduction or thermal decomposition of oxides originally present in the rimmed or semi-killed steel.

It is important that the backup bar be spaced from the joint to be welded. If the backup bar was in contact with the blanks 8, molten deoxidizing metal could alloy with the steel to adversely affect the properties of the weld. For example, if aluminum was used as the backup, molten aluminum could alloy with the steel and if portions of the weld contained more than about 0.5 percent by weight of aluminum severe brittleness and cracking could occur. It is also important that the backup be located beneath the joint to be welded so that the deoxidizing metal vapor will rise and penetrate into the joint. If the deoxidizing metal was located above the joint, it is possible that molten deoxidizing metal could fall by gravity into the weld puddle and thereby alloy with the steel.

The evacuated welding chamber also cooperates with the deoxidizing metal backup to provide increased effectiveness or penetration of the deoxidizing metal vapor into the weld joint. The vaporized deoxidizing metal is in the nascent state and in a vacuum, without the presence of other gas molecules, the vapor can move easily penetrate into the molten weld joint without undue obstruction from the gas molecules. This enables the deoxidizing metal to more quickly seek out and react with oxygen in the steel and thereby minimize the reaction between the oxygen and carbon of the steel.

The use of the deoxidizing metal backup bar has particular significance with high speed electron beam welding in which the weld is made at speeds greater than 25 inches per minute. With high-speed welding, the molten metal will solidify or freeze very quickly as the beam moves along the joint, with the result that carbon monoxide gas molecules formed by reaction of oxygen in the steel and carbon will not have time to evolve from the molten steel before it freezes. Thus there is a tendency for the carbon monoxide to be trapped in the steel as bubbles, thereby producing porosity in the weld. However, with the use of the deoxidizing metal backup, the deoxidizing metal vapor will react with the oxygen so that the formation of carbon monoxide is minimized, and even though high speed welding is employed, porosity in the weld will be substantially eliminated because carbon monoxide is not formed.

It may also be desirable in some instances to apply a thin coating of the deoxidizing metal to one or both of the edges 12. The coating can be applied by rubbing bar stock of the deoxidizing metal along the edge 12, plasma spraying or painting the deoxidizing metal on the edge or applying thin foil of the deoxidizing metal to the edge. During welding, the thin coat of deoxidizing metal will fully vaporize to further increase the wetability of the molten steel and provide more uniform penetration.

Various modes of carrying out the invention are contemplated as being within the scope of the following claims, particularly pointing out and distinctly claiming the subject matter which is regarded as the invention.

We claim:

1. A method of electron beam welding of rimmed or semi-killed carbon steel, comprising the steps of disposing a rimmed or semi-killed steel workpiece having a carbon content less than 0.3 percent and having a joint to be welded in a welding chamber, disposing a backup member of a deoxidizing metal in said chamber on one side of said workpiece in spaced relation to said joint and workpiece, evacuating said chamber, and directing an electron beam from the opposite side of the workpiece toward said joint to melt said workpiece and weld said joint, said electron beam projecting though the joint and space between the backup and workpiece and impinging upon the backup member to vaporize a portion of said backup member and the vaporized metal of the backup member reacting with oxygen released from the workpiece during welding to reduce porosity in the resulting weld.

2. The method of claim 1, wherein said deoxidizing metal is selected from the group consisting of aluminum, titanium, zirconium, magnesium, silicon, ferrotitanium, ferrosilicon, and mixtures thereof.

3. The method of claim 1, and including the step of applying a mass of a deoxidizing metal separate from said backup member to a surface of the workpiece adjacent the joint.

4. An apparatus for welding a joint in a rimmed or semi-killed steel workpiece with an electron beam, comprising a sealed welding zone to contain the workpiece having a joint to be welded, means for evacuating the welding zone, a strongly deoxidizing metal disposed within the zone and spaced beneath the joint and workpiece, and means for generating an electron beam and directing the beam downward toward the joint, said beam melting said workpiece and welding said joint and projecting through the joint, said deoxidizing metal being disposed in the projected path of said electron beam so that said beam vaporizes at least a portion of said deoxidizing metal with the vaporized deoxidizing metal reacting with oxygen in the welding zone to reduce porosity in the weld.

5. The apparatus of claim 4, wherein the deoxidizing metal is aluminum.